UNITED STATES PATENT OFFICE.

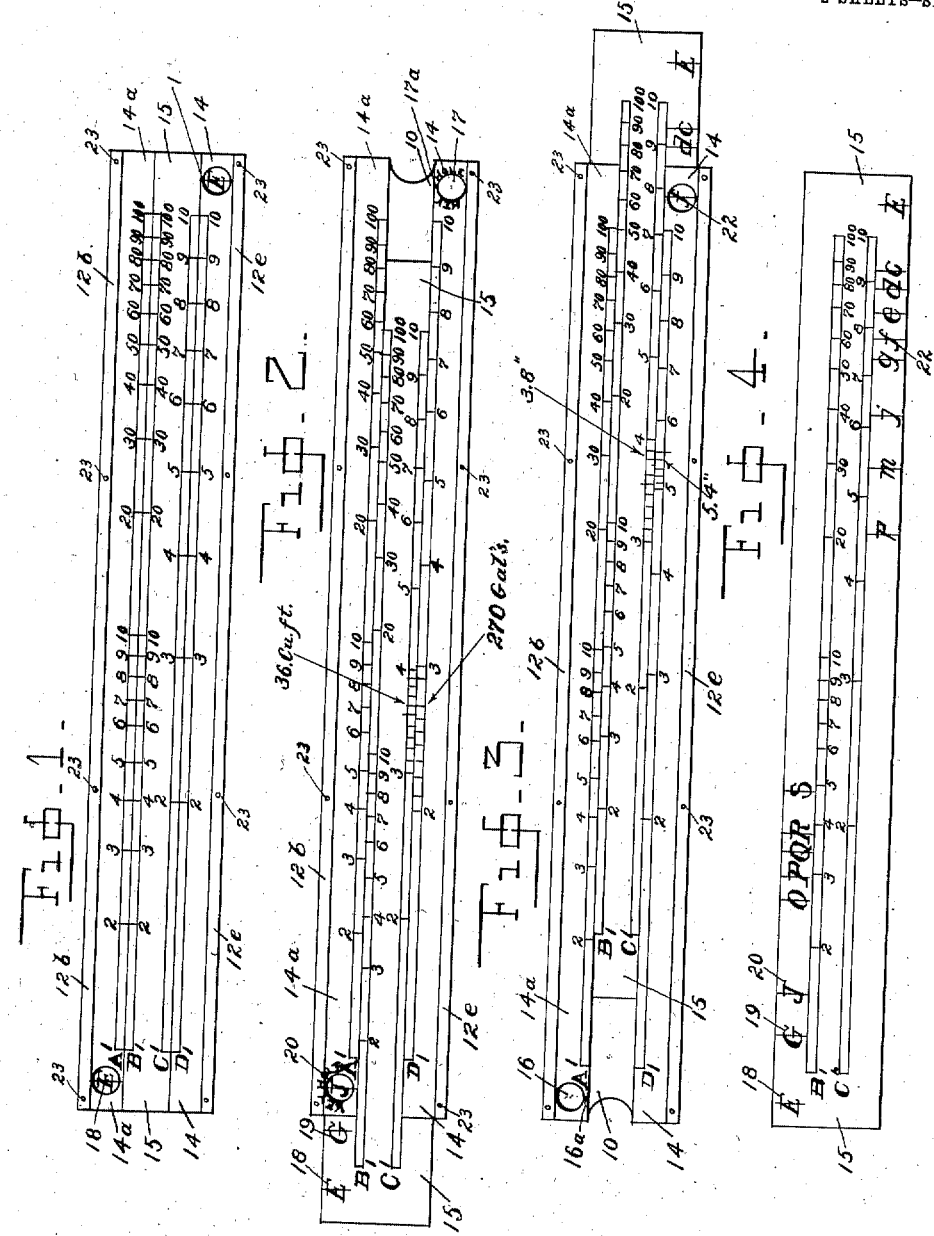
G. W. RICHARDSON.
SLIDE RULE.
APPLICATION FILED AUG. 26, 1909.
982,876.
Patented Jan. 31, 1911.
2 SHEETS—SHEET 1.

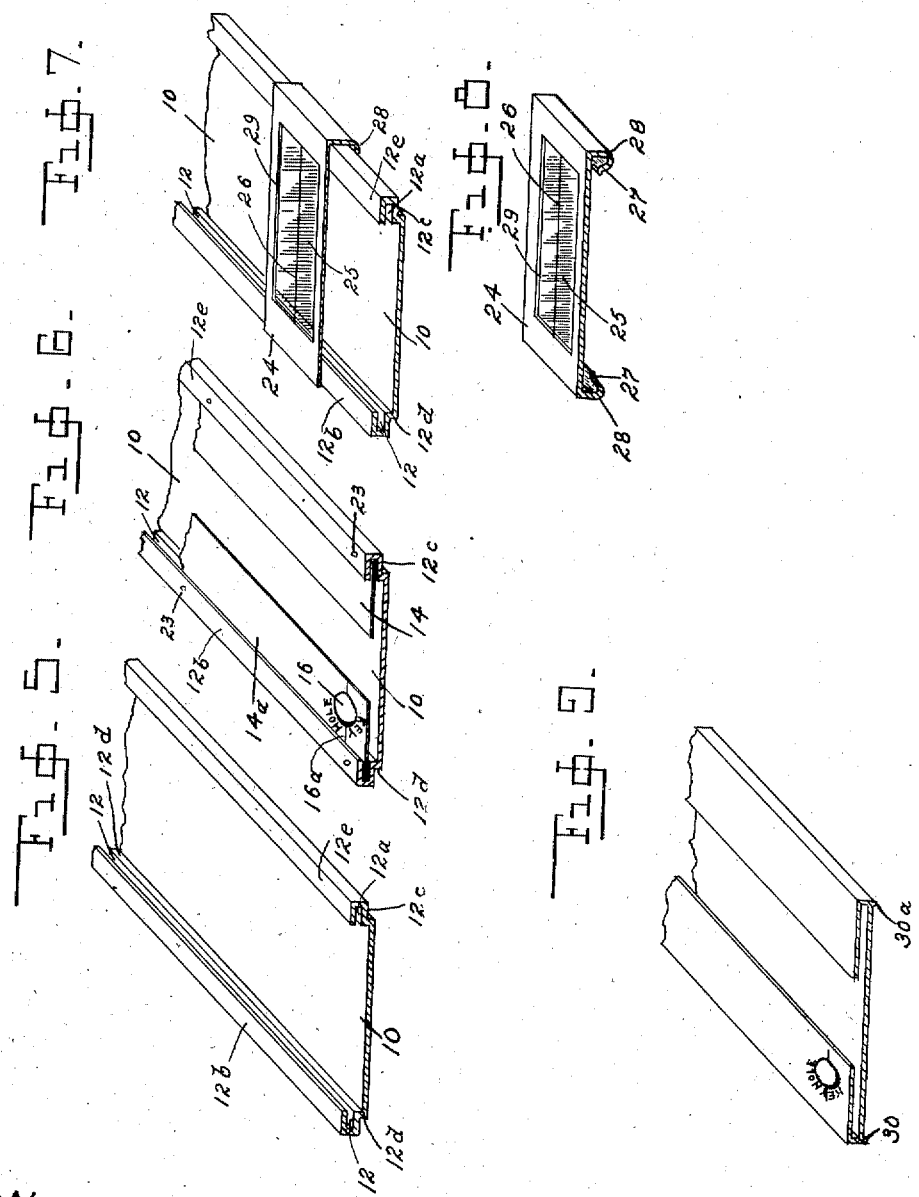

GEORGE W. RICHARDSON, OF CHICAGO, ILLINOIS.

SLIDE-RULE.

982,876.  Specification of Letters Patent.  Patented Jan. 31, 1911.

Application filed August 26, 1909. Serial No. 514,834.

*To all whom it may concern:*

Be it known that I, GEORGE W. RICHARDSON, a citizen of the United States, residing at Chicago, in the county of Cook and State of Illinois, have invented new and useful Improvements in the So-Called "Slide-Rule," of which the following is a specification.

My invention relates to improvements in the construction of slide rules that the cost of production may be reduced to a minimum, thereby permitting a slide rule to be placed upon the market for about one third the price prevailing at present.

Another object is to so construct a slide rule that while it retains all the valuable features of the well known Mannheim rules it will in addition be to a great extent "direct reading," which will meet a long felt want, from a class of engineers known as "operating engineers" who lack the technical training to grasp, even, an inkling of the operation of the slide rules that are upon the market to day. Furthermore it is believed that by placing a slide rule on the market that will not be prohibitive by price, and at the same time made "direct reading" it will pave the way for the universal adoption of this valuable instrument which has practically laid dormant for the last 25 years.

These objects I attain in the manner hereinafter set forth, and finally pointed out in the claims, reference being had to the accompanying drawings, in which—

Figure 1 is a plan view showing "keys" and "key holes" according to my invention, and provided also with the usual scales. Fig. 2 is a similar view except the slide is shown drawn part way out, that the keys on the latter may be observed. Fig. 3 is a similar view to the two preceding ones showing the slide drawn out to the right that the other set of keys on the slide may be shown. Fig. 4 is a plan view of the face of the slide entirely removed, so as to show the keys according to my invention, and provided also with the usual scales. Fig. 5 is an isometric view showing the form according to my invention, of the stock of the rule which is made of aluminum in one piece, and provided with channels, or grooves for holding the upper and lower logarithmical scales, as well as providing an additional wider channel for the slide to move therein. Fig. 6 is a similar view to Fig. 5 except the upper and lower logarithmical scales are shown assembled in the grooves. Also the above mentioned "key hole" is shown to advantage in this view. Fig. 7 is a similar view to the two preceding ones, but illustrates the runner assembled in place and free to slide lengthwise over the face of the stock. Fig. 8 is an isometric perspective view of the runner, showing the curved form of the under side of the runner which, being made of aluminum or other elastic material acts as a sliding shoe upon the under side of channel piece, thereby permitting of the alinement of the runner to any selected place. The shaded surface with the hair line drawn across the same represents a piece of transparent material mounted upon the runner to facilitate the reading from the upper to the lower scales or "vice versa." Fig. 9 represents a modified form of construction according to my invention, of the stock of the rule. In this modified form of construction the stock differs from the preferred form (i. e. scales bearing members assembled in grooves) in that the grooves, and the channels are dispensed with, yet at the same time the overlapping scale bearing members, with the key holes are made part of the stock all in one piece. In case this modified form of construction is found to be preferable the logarithmical scales will be secured to the overlapping members of the stock. In order to strengthen this member and render it more rigid, the under side of the stock is provided with corrugations, or integral reinforcing flanges 30, and 30ᵃ.

Similar reference numerals refer to the similar parts in the several figures.

As stated before the stock of my slide rule is made of metal, and therefore is not subject to the sticking of the slide 15, due to changes in atmospheric conditions. This feature alone should commend the rule to persons who have had their patience taxed to the limit with the use of slide rules constructed of wood.

Fig. 5 is an isometric perspective view of the form and construction of the stock of my slide rule according to my invention. It consists of a stamping made in one piece of metal (preferable of aluminum) the cross piece 10 the under side of which is adapted for a table of reference keys to the problem sought. The reference numerals 12, 12ª, are channels or grooves for the purpose of admitting the two fixed scale bearing members 14, and 14ª the latter of which is held in place (or rather secured in the channel or grooves) by means of small prick-punch marks 23, 23, 23, etc., on the aluminum margins 12ᵇ, 12ᵉ, the latter of which protrude through the aluminum and onto the scale bearing members 14, 14ª. In addition to the two last named grooves 12, and 12ª it will be noted that there is another depression 12ᵈ forming the cross piece 10, also permits of a wide channel or groove for the slide 15 to freely move therein, see Figs. 5, 6, and 7. The fixed scale bearing members 14, 14ª are made preferably of opaque celluloid with white, or ivory finish with the logarithmic scales printed or engraved thereon. In fact the scales can be printed on paper and covered with transparent celluloid and then glued to the scale bearing members 14, 14ª, or the scale bearing members can be made of steel with the scales engraved or stamped thereon, and finally assembled in the grooves 12, 12ª.

The distinguishing feature in the construction according to my invention is in making the stock out of aluminum (or other suitable metal) in the form shown in Fig. 5 or the modified form as in Fig. 9. This form permits of a very wide slide 15. This enables me to print reference keys thereon, besides permits of the overlapping scale bearing members 14, 14ª and the "key holes" 16 and 17 punched in the latter as shown in Figs. 1, 2, 3, and 6.

In Fig. 4 is shown a face, or plan view of the slide 15. It consists of a strip of celluloid with the usual logarithmical scales printed thereon, and in addition to the latter there are printed thereon keys (i. e., characters used in connection with the printed matter upon the back of the rule or cross piece 10) 18, 19, 20, 22, etc., as shown in Figs. 1, 2, 3, and in detail in Fig. 4. These keys will be printed in red ink thereby facilitating the selection of them from the many other lines and markings that go to make up a slide rule.

To facilitate accurate placing of keys the latter are provided with vertical intersecting guide lines, as clearly shown in Fig. 4, and adjacent the openings 16, and 17 are index marks 16ª and 17ª (Figs. 1, 2, 3, 6 and 9) with which the said key guide lines will register when the rule is properly set for that particular key.

It is universally known that the two upper scales are called the A and B scales, while the two lower ones are known as the C and D scales, consequently I have marked them as such in the several views.

The following are a few of the many problems made "direct reading," but by no means the only ones, as the keys selected does not limit the capacity of the rule, and keys may be printed on the reverse side of the slide 15, or additional slides may be used with keys for the solution of any problem.

The following are a few of the many problems made "direct reading" by the keys used in conjunction with the "key holes" punched in the scale bearing members 14, 14ª an explanation of which will be more fully described hereinafter and finally pointed out in the claims.

| Problem required. | Scales to use. | "Key" for key-hole. |
|---|---|---|
| Gallons | D | S |
| Cubic inches | C | |
| Gallons | D | J |
| Cubic feet | C | |
| Gallons | D | c |
| Weight water | C | |
| Head in feet (water) | A | g |
| Lbs., per sq. inch | B | |
| Cubic inches | C | O |
| Cubic feet | D | |
| Circumference of a circle | A | j |
| Diameter of a circle | B | |
| Area of a circle | A | G |
| Diameter of a circle | C | |
| Side of a square | C | f |
| Diagonal of a square | D | |
| Meters | A | Q |
| Inches | B | |
| Kilo-watts | C | e |
| Horsepower | D | |
| B. T. U. per minute | A | m |
| Horsepower | B | |
| Evaporation fm. and at, lbs. per hr. | B | P |
| Standard boiler horsepower | A | |
| Direct radiation | B | G |
| Square foot of grate | A | |
| Diameter of safety valve | C | d |
| Square ft. grate | A | |
| Any number | A | E |
| Square root | D | |
| Sq. ft. of radiation | B | G |
| Diameter of steam main | C | |
| Stroke in inches x r. p. m | A | P |
| Piston speed ft. per min | B | |
| D² x M. E. P. x ft. per min | B | R |
| Horsepower | A | |
| Vel. x area x head, all in feet | B | S |
| Horsepower of water fall | A | |
| Cubic ft. of air per min. (vel. assumed to be 540 f.) | B | S |
| Area of duct in sq. ft | A | |

Reverting now, for an illustration, to the second mentioned problem viz:—Required to find the number of U. S. gallons there are contained in 38 cubic feet? By referring to the printed matter upon the back of the rule (a facsimile of which is represented in above table) it will be noted for a problem of this character, found under the head of "Problems" the gallons will be found on the lower, or D scale, while the cubic feet will be given adjacent thereto on the C scale. In the column under the heading of Keys you will see that the proper key to use is the letter J. Therefore to perform the operation proceed as follows:— Draw out the movable slide 15 to the left until the key J appears in the "key hole" 16 as shown in Fig. 2 at 20. Then observe on the C scale adjacent to 36 cubic feet the answer 270 gallons on the D scale as indicated by the arrow heads. Likewise let it be required to find the diagonal of an equal square of 3.8 inches. Under the heading of Problems it will be noted the proper scales to use are the C and D scales same as before and the proper key is f. Consequently place the key f in the "key hole" 17 as at 22 Fig. 3 and adjacent to 3.8 inches on the C scale read the answer 5.4 inches nearly on the D scale, as indicated by the arrow heads in Fig. 3.

Fig. 8 is an isometric view of the runner 24 which is free to run or slide over the face of the scales and upon the margins $12^b$ and $12^e$, the ends of the runner 24 is bent over and around the corners of the stock of the rule, and by a graceful curve 28 forms a spring action permitting of tension upon the under side of stock at $12^c$ by the shoe rounding edge 27. This tension of the spring action at 28 against the surface $12^e$ provides a means of holding the runner 24 in any set position, yet at the time permits the runner to move operatively as desired. The runner 24 is provided with a small window frame opening as at 29, in which is placed a piece of some transparent material 25 with a hair line marked or scratched at right angles to the shortest side as at 26.

Having described this invention in connection with illustrative embodiments thereof, to the details of which disclosure the invention is not, of course, to be limited, what is claimed as new and what is desired to be secured by Letters Patent is set forth in the appended claims.

1. A slide rule, comprising a stock formed of sheet material, parallel scale bearing members provided with sight openings, turned margins on the stock adapted to engage said members, and a slide having characters adapted to register successively with the sight openings.

2. A slide rule comprising a stock formed of sheet material, turned edges on the stock, a plurality of scale bearing members fixed on said stock and secured by the turned edges of the stock, and a slide having its margins underlying said strip.

3. A slide rule comprising a stock provided with a longitudinal depression, and having portions overhanging said depression and furnished with openings, a slide arranged in said depression, and characters on said slide adapted to register with said openings.

4. A slide rule, comprising a stock formed of sheet material, scale bearing strips arranged parallel on said stock and having their adjacent margins spaced from each other and from the stock, and a slide having its edges underlying said strips.

5. In a slide rule, the combination of a sheet metal stock, turned edges on said stock, scale bearing strips engaged by said turned edges and provided with sight openings, a slide arranged below said strips and characters on said slide adapted to register with said openings.

6. In a slide rule, the combination of a stock formed of sheet material, turned edges on the stock, scale bearing strips engaged by said turned edges and provided with sight openings, a slide arranged below said strips, and characters on said slide adapted to register with said openings.

7. In a slide rule, the combination with a stock, turned margins on the stock, scales engaged by said turned margins and provided with sight openings, and a slide having characters coöperating with the said openings.

8. In a slide rule, a stock formed of sheet metal and having a longitudinal channel, grooves formed by the turned margins of said stock, scales engaging said grooves and provided with sight openings, a slide arranged in said channel, and characters on the slide adapted to register with said openings.

9. In a slide rule, a stock formed of a single piece of sheet metal and having a longitudinal channel, grooves formed by the turned margins of the stock, scales engaging said grooves and overhanging said channel and provided with sight openings, a slide arranged in said channel beneath the overhanging scales, and characters on the slide adapted to register with said openings.

10. In a slide rule, consisting of a main piece, or stock, formed in one piece out of sheet aluminum, with two channels or grooves adapted to receive and hold secure two celluloid strips by means of prick punch marks, said prick punch marks to protrude through the turned margin of the aluminum and onto the celluloid, the two strips of celluloid having printed or engraved upon their faces the usual logarithmical scales, and "key holes" punched in said scales at each end, a slide made preferably of celluloid with the usual logarithmical scales printed or engraved thereon, and additional keys printed above and below the logarithmic scale, the said slide with the logarithmical scale and the keys operatively connected and free to move beneath the two overlapping scale bearing members, the keys being located on the slide in such a position that they will be observed or made visible through the "key hole" as the said slide is pulled out to the left, or the right.

11. In a slide rule, consisting of a stock made in one piece (preferably of aluminum) with grooves in the turned edges of said stock, for receiving and holding secure scale bearing members, and an additional depression for the acceptance of a slide, the said stock being so formed by the operation of the turned edges to form the grooves, permits of a runner to be assembled to work freely over the said formed groove casing, the said runner being made of sheet aluminum or other elastic metal has spring formed curved edges working against the under side of the channel or grooved casing all substantially as set forth.

12. In a slide rule, the combination with a stock, turned margins on said stock, scales engaged by said turned margins and provided with sight openings, a slide having characters coöperating with the said openings, and a runner engaging said turned margins.

GEORGE W. RICHARDSON.

Witnesses:
CLARA A. RICHARDSON,
CHARLOTTE E. PALMER.